United States Patent
Steward

[15] 3,670,435
[45] June 20, 1972

[54] MAGNETIC IN AND OUT BOARD
[72] Inventor: William A. Steward, Somerset, Calif.
[73] Assignee: Wm. A. Steward Company
[22] Filed: Oct. 27, 1970
[21] Appl. No.: 84,339

[52] U.S. Cl. ..................................40/106.45, 40/142 A
[51] Int. Cl. ..............................................G09f 19/02
[58] Field of Search ............... 40/106.45, 142 A; 35/7 A, 24

[56] References Cited

UNITED STATES PATENTS

| | | |
|---|---|---|
| 2,324,934 | 7/1943 | June ............................................. 35/24 |
| 3,518,428 | 6/1970 | Ring ..................................... 40/142 A X |
| 2,643,466 | 6/1953 | Bucher ................................... 40/142 A |
| 2,630,765 | 3/1953 | Small ................................. 40/106.45 |

FOREIGN PATENTS OR APPLICATIONS

| 273,413 | 7/1927 | Great Britain ....................... 40/142 A |
|---|---|---|

*Primary Examiner*—Robert W. Michell
*Assistant Examiner*—Richard Carter
*Attorney*—Eckhoff and Hoppe

[57] ABSTRACT

An "in and out" device is provided for indicating the whereabouts of the various personnel such as their availability on the premises or when they will return.

1 Claim, 3 Drawing Figures

PATENTED JUN 20 1972    3,670,435

INVENTOR.
WILLIAM A. STEWARD
BY
ATTORNEYS

MAGNETIC IN AND OUT BOARD

BACKGROUND OF THE INVENTION

In many offices it is usual to employ an "in and out" device at the desk of the receptionist or telephone operator so that the whereabouts and availability of the various executives and office personnel can be readily ascertained. Generally, these boards utilize various mechanical means such as horizontal slots with sliding indicators that extend through the board and show up on the other side. These boards are complicated in their construction and expensive to manufacture.

SUMMARY OF THE INVENTION

In accordance with this invention, I provide a thin sheet mounted in a vertical position and suitably inscribed with the name of the personnel involved. The board also is marked with "in and out" positions and time designations showing when a person who has left the premises expects to return. The indication is provided by opposite magnets of sufficient strength such that when one magnet is moved, the magnet on the opposite side moves to the same extent. The board may be opague, translucent or transparent. Also, it should be of a nonferrous material such as paper, cardboard or a suitable plastic.

In general the broad object of the present invention is to provide an improved and simplified "in and out" indicator device.

DESCRIPTION OF THE PREFERRED EMBODIMENT

The indicator device of the present invention includes a base 6 having opposite upright spaced arms 7 and 8 on opposite sides thereof channeled to receive a suitable indicator sheet, generally indicated at 9. This sheet is marked off across its width with such indicia as the name of the personnel, generally indicated at 11, "in and out" indicators 12 and 13 and time indicator 14 indicating when a person who is "out" expects to return. Like designations appear on the opposite side of the sheet but in mirror image so that persons on opposite sides of the sheet can ascertain the desired information from the side of the sheet which is in view.

Figure 1:
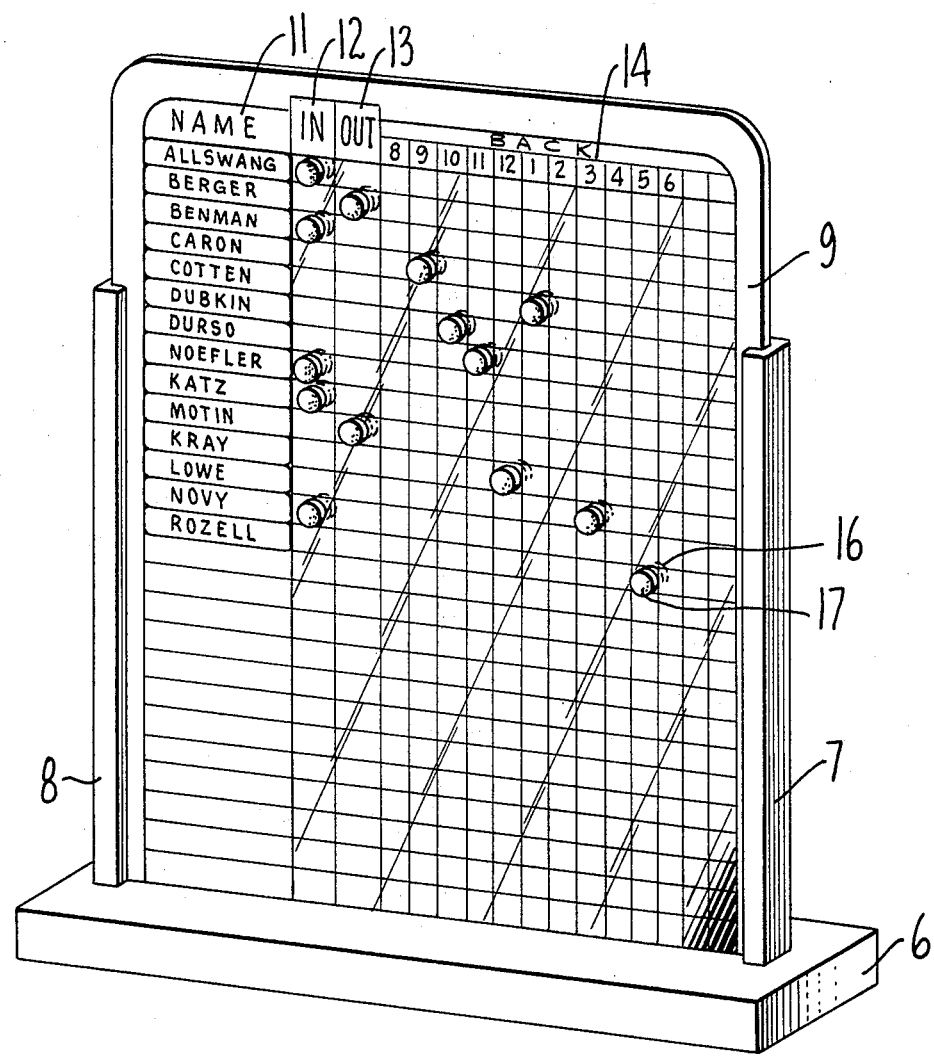
FIG. 1 is a perspective view showing one side of the indicator board.
Figures 2, 3:
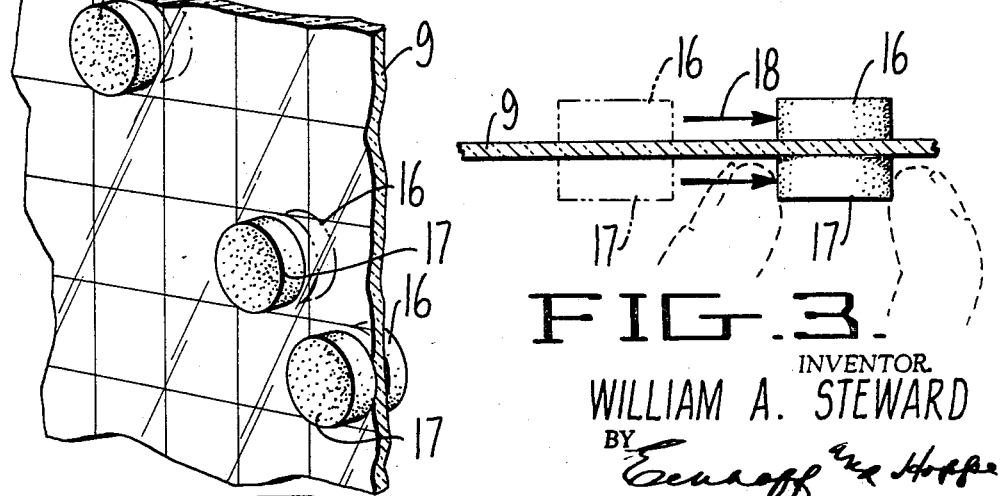
FIG. 2 is an enlarged fragmentary view taken through a section of the indicator board.
FIG. 3 is a cross section taken through the board and showing the manual movement of the opposed magnets which serve as indicators.

In accordance with this invention, a pair of opposite magnets 16 and 17 are provided for each person named. When it is desired to change the position of the magnets to indicate an alteration in the status of the individual, a magnet on one side of the sheet is grasped between opposite fingers and then moved to a new position. This is shown by the movement from the dotted line position in FIG. 3 to the solid line position and by the arrows 18. The information provided on the board can, of course, be changed to suit any given situation. As the magnetic material one can use any of those having relatively high strength per unit of volume such as alnico, magnetite, gamma ferric oxide, ferrites or other ceramic magnetic materials such as barium titanate.

I claim:

1. A magnetic "in and out" indicating board for indicating whether various personnel are "in" or "out" and when they will return, comprising a thin, vertical sheet of nonferrous material having fixed indicia on both sides thereof, said indicia on one side being the mirror image of the indicia on the other side, said indicia including a plurality of names or the like arranged in a column along one edge of the sheet and "in" and "out" and time designations or the like along another edge thereof, a plurality of horizontal and vertical criss-crossing lines on each side of said sheet and dividing the opposite sides of said sheet into a plurality of areas corresponding to the indicia thereon, and a plurality of magnet pairs on opposite sides of said sheet with the magnets of each pair aligned on opposite sides of the sheet and held in position on said sheet by the mutual magnetic attraction therebetween, said magnets being movable to an appropriate area on said sheet to indicate the presence or absence or the like of personnel or the like, movement of a magnet on one side of the sheet effecting movement of a corresponding magnet on the other side thereof so that the indication is made simultaneously on both sides of the sheet.

* * * * *